G. WHITE.
COATING MACHINE.
APPLICATION FILED JULY 19, 1913.

1,285,516.

Patented Nov. 19, 1918.
5 SHEETS—SHEET 1.

WITNESSES:
Charles Mathé
John P. Kirby

INVENTOR
George White
BY
John Lofka
ATTORNEY

G. WHITE.
COATING MACHINE.
APPLICATION FILED JULY 19, 1913.

1,285,516.

Patented Nov. 19, 1918.

5 SHEETS—SHEET 2.

WITNESSES:
Charles Mathe
John P. Kirby

INVENTOR
George White
BY John Lotka
ATTORNEY

G. WHITE.
COATING MACHINE.
APPLICATION FILED JULY 19, 1913.

1,285,516.

Patented Nov. 19, 1918.
5 SHEETS—SHEET 3.

WITNESSES:
Charles W...
John P. Kirby

INVENTOR
George White
BY
John Lo...
ATTORNEY

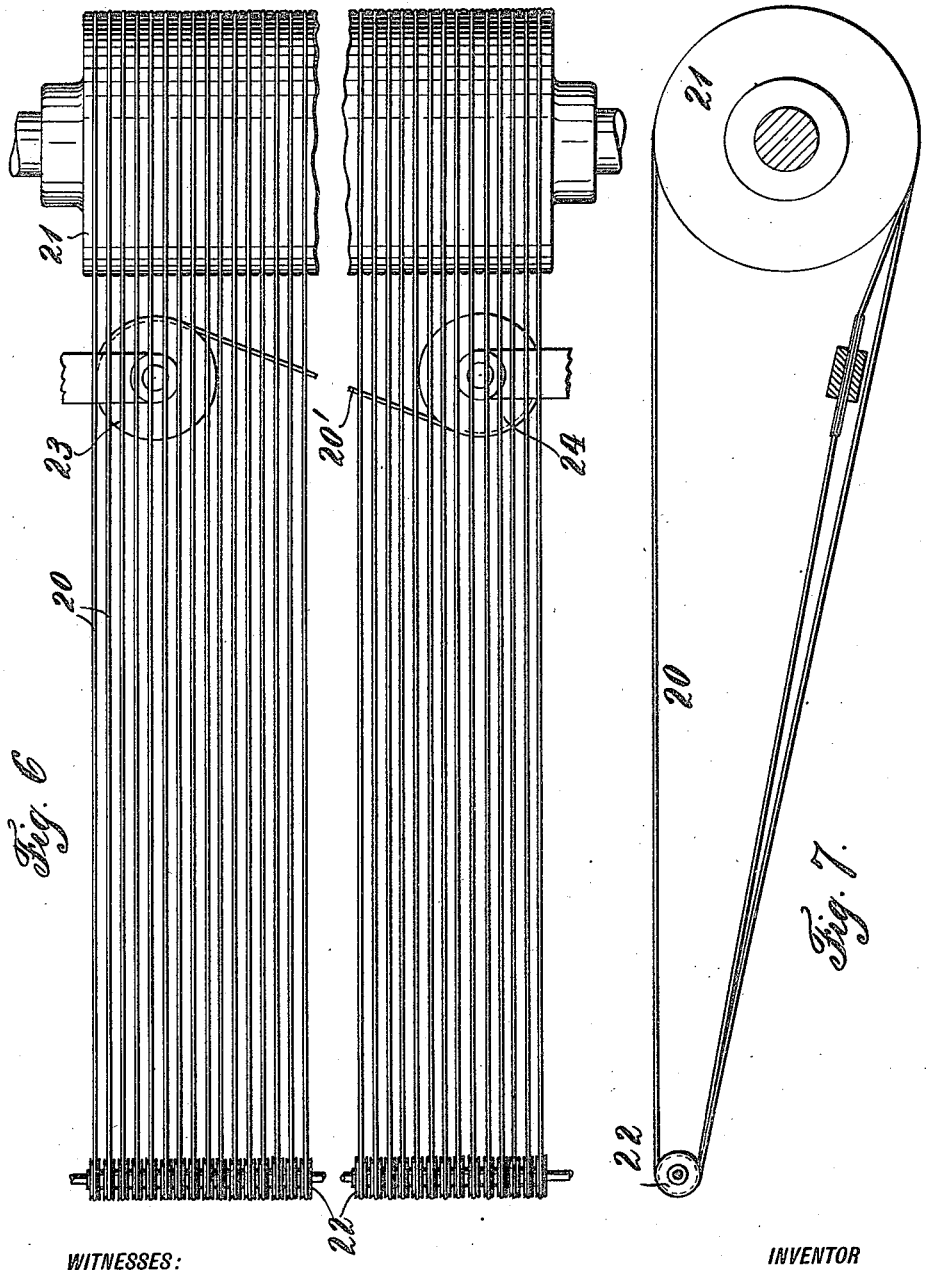

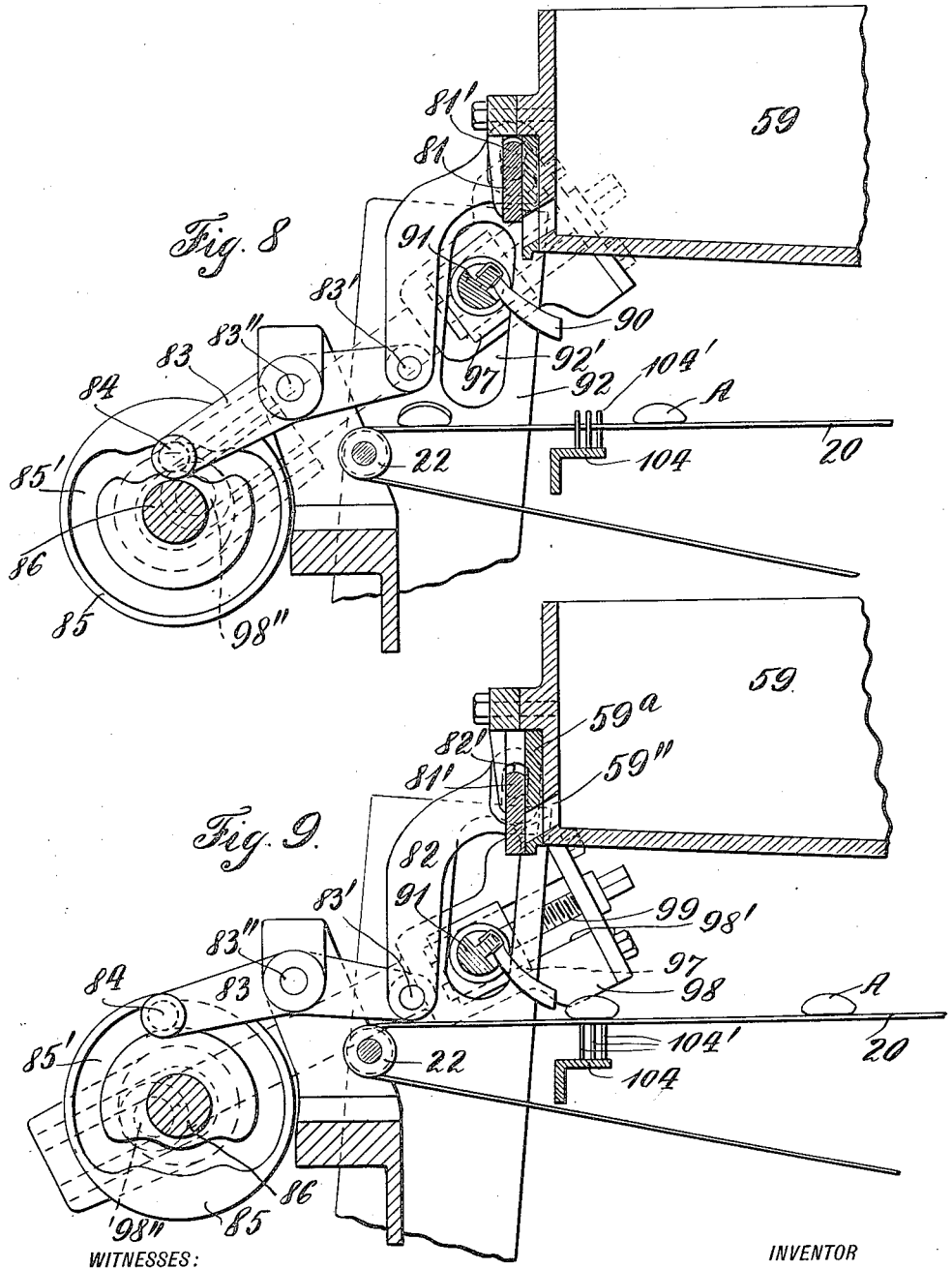

UNITED STATES PATENT OFFICE.

GEORGE WHITE, OF JERSEY CITY, NEW JERSEY, ASSIGNOR TO PANAYIOTIS PANOULIAS, OF JERSEY CITY, NEW JERSEY.

COATING-MACHINE.

1,285,516.

Specification of Letters Patent.  Patented Nov. 19, 1918.

Application filed July 19, 1913. Serial No. 779,986.

*To all whom it may concern:*

Be it known that I, GEORGE WHITE, a citizen of the United States, and a resident of Jersey City, in the county of Hudson and State of New Jersey, have invented certain new and useful Improvements in Coating-Machines, of which the following is a specification.

My present invention relates to machines for applying to candies or other articles, generically referred to as "cores", a coating of a suitable, preferably liquid or viscous substance, such as chocolate. The object is to arrange and coat these articles or "cores" evenly, and also to apply an additional ornamental coating or "stroking" if desired.

Figure 1:
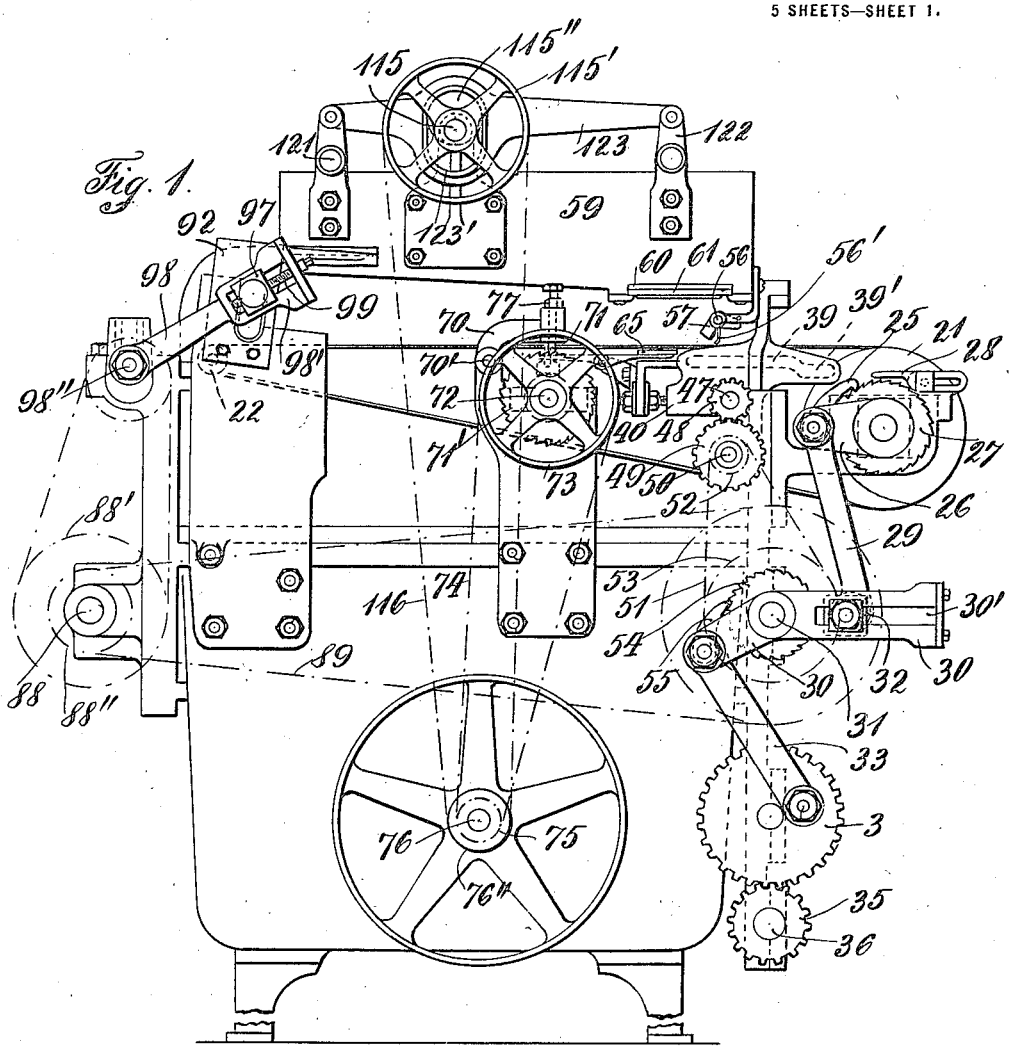
Figure 11:
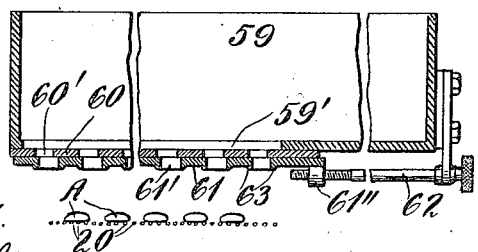
Figure 2:
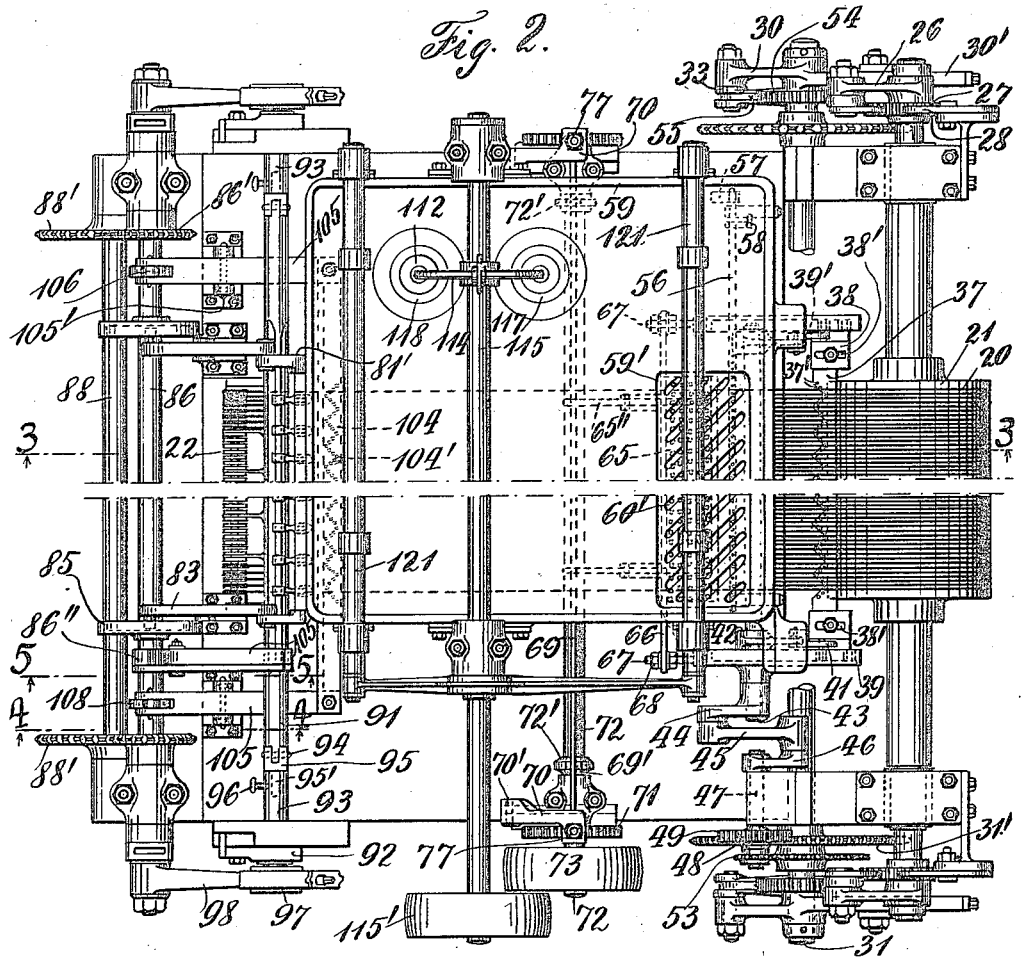
Figure 4:
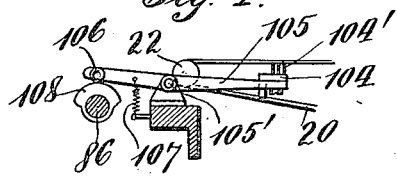
Figure 5:
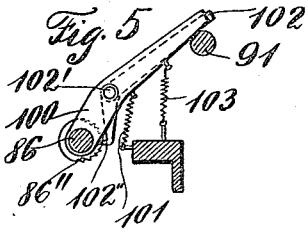
Figure 3:
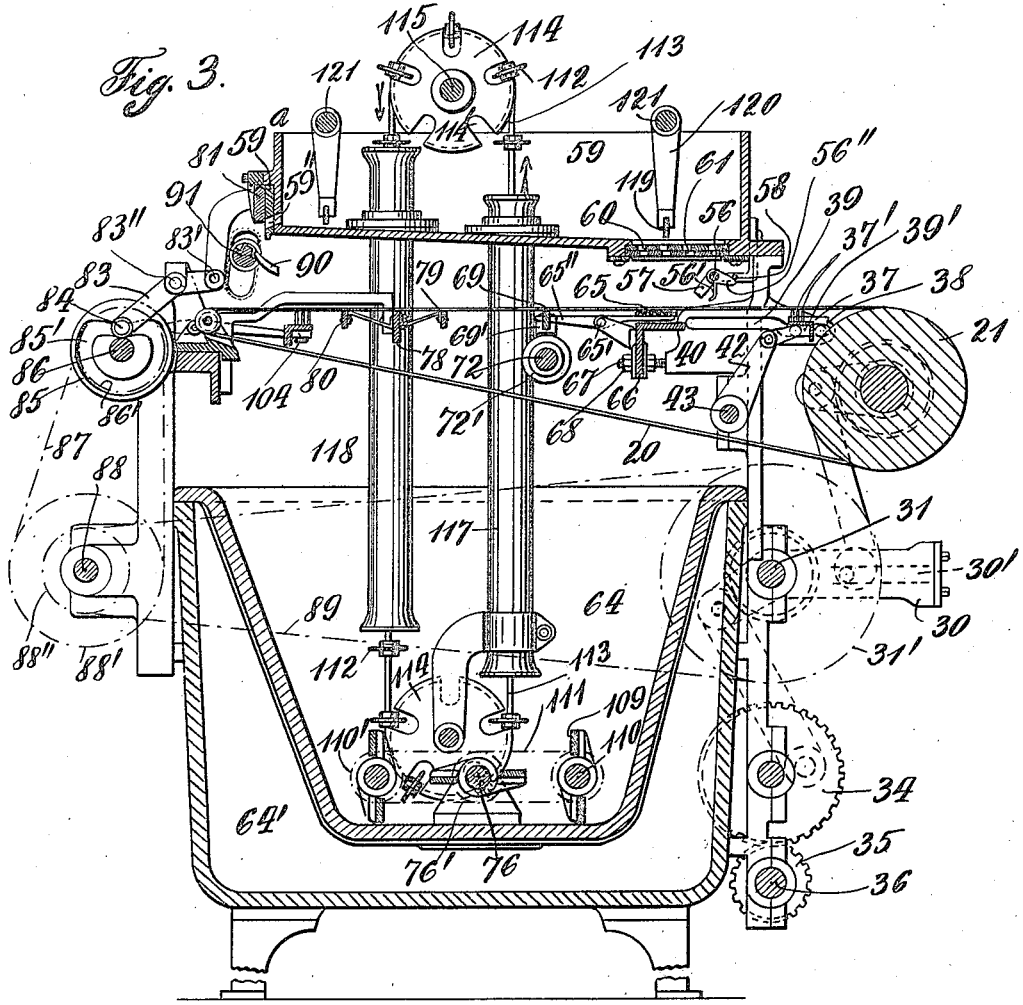
Figure 10:
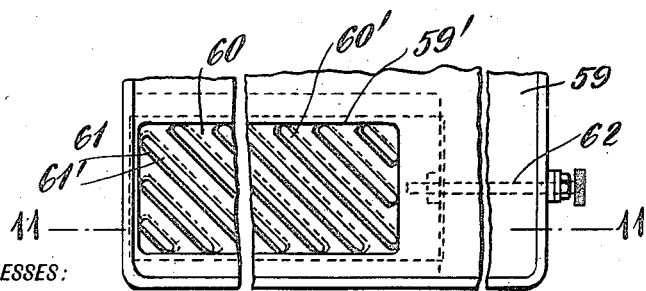

A specific embodiment of my invention will now be described in detail with reference to the accompanying drawings, in which Figure 1 is a side elevation of the machine; Fig. 2 is a plan view thereof, with parts broken away; Fig. 3 is a vertical section on line 3—3 of Fig. 2; Figs. 4 and 5 are detail sections taken substantially on lines 4—4 and 5—5 respectively of Fig. 2; Fig. 6 is a plan view of the conveyer employed in my machine, and Fig. 7 is a side elevation thereof; Figs. 8 and 9 are sectional views, on the same plane as Fig. 3, showing the stroking mechanism in two positions, on an enlarged scale; Fig. 10 is a partial plan view of the mechanism for controlling the flow of the coating liquid; and Fig. 11 is a vertical section taken on line 11—11 of Fig. 10.

The articles or cores A (Fig. 11) are carried through the machine by means of a suitable conveyer on the upper run of which they are deposited in any approved manner. This conveyer is preferably of an apertured or open-work character so that the coating material (say, liquid or viscous chocolate) may pass therethrough for the purpose set forth hereinafter. In the particular embodiment shown, the conveyer consists of an endless strand 20 of wire or other suitable material passed to and fro between a supporting roller 21, preferably formed with separate parallel grooves to receive and hold properly spaced, the several runs of the strand 20, and a corresponding series of properly spaced grooved disks 22. The upper runs of the strand are exactly in line with the grooves of the roller 21 and disks 22, but the lower runs are slightly oblique, that is to say, the second lower run extends from the first groove of the roller 21 to the second disk 22. The first lower run extends to the first disk 22 from a roller 23 having an upright axis, and the last lower run extends from the last groove of the roller 21 to a roller 24 similar to the roller 23, and these first and last lower runs are connected by a transverse run 20'. An intermittent motion (always in the same direction) is given to the conveyer by means of a feed pawl 25 secured pivotally to an arm 26 which is mounted to swing independently of the roller 21, but about the same axis. The pawl 25 engages the teeth of a ratchet wheel 27 held to turn with the roller 21, an adjustable finger 28 acting to throw the pawl 25 out of engagement with the ratchet wheel 27 at the proper point. With the arm 26 is pivotally connected a link 29 the lower end of which has a like connection with a rocking arm 30 mounted loosely on a shaft 31. Preferably the connection of the link 29 with the arm 30 is effected by means of a block 32 adjustable in a radial slideway 30' and secured, after adjustment, by a nut or other suitable means. Thus I can vary the throw of the arm 26 and therefore the longitudinal movement given to the conveyer at each step of the operation. The arm 30 receives its rocking movement by means of a link 33 the lower end of which is pivoted eccentrically to a gear wheel 34 driven by a pinion 35 on a power shaft 36.

The articles deposited on the upper run of the conveyer are required to aline transversely, and as they may not always be alined perfectly, the following mechanism is provided to insure perfect alinement: A transverse bar 37 arranged beneath the upper run of the conveyer is provided with upwardly projecting pins 37' registering with the spaces between the upper runs of the strand 20, so that at times said pins may project between and above said upper runs. As shown in Fig. 2, the pins 37' are disposed in V-fashion, forming angles or pockets which will catch and a line in a true transverse row and at equal distances from each other, any articles which may lie on the upper run of the conveyer in front of the said pins.

The bar 37 is carried by two slides 38 movable in guides 39, 39' provided in brackets 40 secured to, or forming part of, the frame of the machine. In order to facilitate the proper positioning of the bar 37, the slides 38 may have slots 38' parallel to the strands of the conveyer, to receive bolts secured to the slides, the parts being held by nuts after adjustment. Each of the slides 38 is connected pivotally with the upper end of a link 41, the lower end of such link being pivoted to a crank arm 42 secured to a rock shaft 43. This shaft has another crank arm 44 connected by a link 45 with a crank arm 46 on a shaft 47. A pinion 48, secured to the shaft 47, meshes with a toothed wheel 49 on a shaft 50. (In the example shown in the drawing, the shaft 50 alines with the rock shaft 43, but this is immaterial). The shaft 50 is driven, as by means of a chain 51 engaging a sprocket 52 on the shaft 50 and another sprocket 53 on the shaft 31. The latter also has secured to it a ratchet wheel 54 engaged by a pawl 55 pivoted to the rocking arm 30. Thus, owing to the intermittent rotation of the shaft 47, the arm 42 is rocked first in one direction and then in the other. In the position shown in Fig. 3, the slides 38 are in the guide portions 39', which are at such a level that the pins 37' will be below the upper run of the conveyer, so as not to interfere with the feeding of the "cores" to said conveyer. As the slides 38 move toward the left in Figs. 1 and 3, they reach the guide portions 39 which are nearer the upper run of the conveyer; thus the pins 37' will be caused to pass upward between the strands 20 of the upper run and in this projecting position to move lengthwise of the conveyer. This not only brings the articles on the conveyer, to the coating position, but at the same time (owing to the V-shaped arrangement of the pins 37') the articles or "cores" will be brought into perfect transverse alinement and spaced evenly. After bringing the articles to this position, the bar 37 with the pins 37' goes back to its rear (lowered) position, the articles remaining in their forward position. If any sticky cores should adhere to the pins 37', such cores might follow the pins in their return movement, and thus the proper arrangement of the cores might be disturbed. In order to prevent this, I may provide a retaining gate consisting of a pivoted transverse rod 56 made with downwardly extending (preferably hook-shaped) pins 56'. A weight 57, connected with the rod 56, tends to keep it in the position shown in Fig. 3, in which an arm 56'' on the rod engages a stationary stop pin 58. When the cores A are pushed forward by the pins 37', the pins 56' will yield and allow the cores to pass. If any cores should adhere to the pins 37', the hook-shaped pins 56' will engage such cores and prevent them from following the pins 37' on their return movement. The pins 56' of course are not in the path of the pins 37', so as not to interfere with the return movement of the pins 37'.

Above the upper run of the conveyer is located a tank 59 adapted to contain the material (such as liquid chocolate) with which the cores are to be coated. The tank bottom preferably slopes toward the main outlet 59' below which is arranged a stationary plate 60 having a series of slots 60', preferably oblique with reference to the direction in which the conveyer travels. Underneath the plate 60 is arranged a movable plate 61 having slots 61' similar in position and arrangement to the slots 60'. By shifting the plate 61 transversely, the effective width of the slot outlets can be varied, or the outlets can be closed altogether. The plate 61 may be constructed as a slide with an internally screw-threaded bracket 61'' engaged by a screw rod 62 mounted to turn but held against longitudinal movement. Along the edges of the openings or slots 61', on the outlet side thereof, that is to say, on the lower surface of the plate 61, downwardly projecting ribs 63 are preferably formed around said slots; I have found that this secures an even flow of the material and prevents the material from adhering to, and spreading on, the lower surface of the plate 61. Thus the streams of material issuing from the several outlets or nozzles are kept separate.

As the longitudinal movement of the conveyer carries the cores A under and through the streams of coating material, the cores receive a coating of such material on all sides. Part of the surplus material adheres to the strands 20 of the conveyer, but the greater part drops through the conveyer, and falls either into a lower tank 64 or onto a bottoming bar 65. This bar is perforated as shown in Figs. 2 and 3, the perforations being small enough to be normally filled by the viscous material, but allowing some of the material to drop through slowly, thus preventing the material from hardening in the perforations. The bottoming bar 65 is fulcrumed at 65' on a bracket 66, preferably adjustable lengthwise of the conveyer, as by mounting said bracket on screws 67, with nuts 68 on each side of the bracket to hold it after adjustment. The bottoming bar has arms 65'' extending loosely through appropriate slots in a vibrator bar 69, so that the longitudinal adjustment of the bottoming bar 65 will not interfere with the operation of the said vibrator bar 69. The latter is secured rigidly to arms 70 fulcrumed at 70', and the upper edge of the bar engages the upper run of the conveyer from below and is adapted to vibrate this conveyer up and down. For this purpose, two pins or pawls 71 secured to the arms 70, engage ratchet wheels 71' rigidly mounted on a shaft 72. A sprocket wheel or pulley 73 is also mounted on said shaft, and is driven constantly by a chain or belt 74 connecting said pulley with a companion pulley 75 on a power shaft 76. On the shaft 72 are secured collars 72' on which the vibrator bar 69 strikes on its downward movement, the bar being provided with blocks 69' adapted to engage said collars. In order to compensate for wear, the pins 71 may be adjustable vertically, as by screwing them into the ends of the arms 70 and then holding them with lock nuts 77. This mechanism imparts an up-and-down vibrating motion to the bar 69 and to the conveyer engaging it, and also to the bottoming bar 65. The cores are therefore thoroughly coated with the chocolate or other material. It will be observed that at any particular moment, the bottoming bar and the bar 69 which jolts the conveyer move in opposite directions, so that, at the time the bottoming bar moves upwardly, the adjacent portion of the conveyer is moving downwardly to meet the material thrown or jolted up by the ascending bottoming bar, and this arrangement assists greatly in securing an efficient distribution of the material on the lower surfaces of the cores. When the bar 37 is on its return movement (to the right in Figs. 1 and 3), it will carry toward the receiving end of the conveyer, some of the coating material, so that when the cores are deposited on the conveyer, their bottoms will not touch the wire strand, but will engage the coating material adhering to said strand. The thorough coating of the core bottoms is thus facilitated.

In advance of the vibrator bar 69, the upper runs of the conveyer are engaged by a stationary supporting bar 78 the purpose of which is to arrest the vibration of the conveyer at this point. That is to say, the portion of the conveyer between the bars 78 and the roller 21 is the only portion of the conveyer which receives an up-and-down vibrating motion. The lower surface of the upper conveyer run is also engaged by stationary scraper bars 79 and 80 arranged respectively in the rear and in advance of the supporting bar 78. Thus, the inner surface of the conveyer, which touches the roller 21 and disks 22 is scraped so as to keep said roller and disks clean.

In some cases, it is desired to provide the cores after they have been coated, with a slight supplemental coating applied in the shape of a line or stroke. For this purpose, the tank 59 may be provided with supplemental outlets 59" at the end opposite to the outlet 59'. In front of the outlets 59" is arranged to slide vertically a gate 81 having at its ends pins 81' extending in approximately vertical slots 82' of links 82. Each link 82 is connected pivotally at 83' with a lever 83 fulcrumed on the frame at 83". The other ends of the levers 83 carry pins or rollers 84 traveling in cam grooves 85' of cam disks 85 secured to a shaft 86. The shaft 86 is driven by means of chains 87 engaging sprocket wheels 86' and 88', the latter being secured to a countershaft 88 which also carries sprocket wheels 88" connected by chains 89 with sprocket wheels 31' on the shaft 31. The shaft 86 thus receives an intermittent motion, always in the same direction. The pin-and-slot connection at 81', 82' produces a lost motion, so that the gate 81 will remain stationary in its extreme upper and lower positions until the links 82 have traveled a sufficient distance to bring the pins 81' in contact with the opposite ends of the slots 82'. The gate 81 will thus be opened and closed quickly.

The material from the tank 59 flows through the outlets 59" which are spaced at distances corresponding to the distances between the cores A, said distances being governed by the pins 37' of the alining and spacing bar 37, and also by a supplemental alining and spacing mechanism to be described hereinafter. The material issuing from the outlets 59" is adapted to be transferred to the cores on the conveyer by means of spoons 90 secured in any suitable manner to a rod 91, at intervals corresponding to the spacing of the outlets. The rod 91 is guided in its up-and-down movement by stationary brackets 92 having slots 92' in which are adapted to move extensions 93 alining with the rod 91 and suitably connected therewith. In the particular construction shown, pins 94 connect the rod 91 detachably with forked members 95 each of which is provided with a shank 95' extending axially into the corresponding extension 93, so that the rod 91 and the spoons carried thereby may be turned relatively to said extensions and thus adjusted to different angular positions, being then locked by means of set screws 96. The purpose of making the rod 91 readily removable is to adapt the machine for a different spacing of the cores, by the substitution of another rod 91 having the spoons differently spaced; for the same purpose, the outlets 59" are preferably made in a separate removable plate 59ᵃ. To the ends of the extensions 93 are secured blocks 97 secured to arms 98. Preferably, the blocks are adjustable lengthwise of said arms, as by means of screws 99 mounted to turn in the arms but held against longitudinal movement, said screws having a threaded engagement with the blocks 97 engaging longitudinal slideways 98' of the arms 98. The lower ends of the arms 98 have a crank-pin connection 98″ with the shaft 86, the connection being preferably an adjustable one so that the eccentricity of the crank pin may be varied.

In order to insure the proper discharge of the material from the spoons 90, the latter are vibrated or shaken during their upward movement, which is the time at which the coating operation takes place. The mechanism for accomplishing this is shown in Figs. 2 and 5 and comprises an arm 100 mounted loosely on the shaft 86 and permanently held in engagement with the spoon rod 91 by means of a spring 101. On this arm is fulcrumed at 102′ a striker lever 102 provided with a pawl shaped end 102″ which engages a mutilated ratchet wheel 86″ on the shaft 86. Thus, during a part of the rotation of said shaft, the ratchet 86″ will vibrate the lever 102 so as to cause it to give a quick succession of blows to the spoon rod 91 under the influence of a spring 103 connected with said lever. The time when the pawl-shaped end 102″ of the lever 102 is in contact with the smooth portion of the mutilated ratchet 86″, coincides with the downward movement of the spoon rod, so that the latter and the spoons carried thereby are shaken only during the upward movement.

While the bar 37 with its pins 37′ properly alines and spaces the cores A on the upper run of the conveyer, the vibration given to the major portion of said upper run is liable to disarrange the cores. Therefore, in order to restore the proper spacing and alinement of the cores before they receive their second coating or so-called stroking from the spoons 90, I provide a bar 104 having pins 104′ arranged in V-shaped fashion, in a manner similar to that described with reference to the pins 37′. The pins 104′ are at times below the upper run of the conveyer, as shown in Figs. 4 and 9. The bar 104 is carried by two levers 105 fulcrumed at 105′ and carrying rollers 106, springs 107 being connected with said levers to keep the rollers in contact with cams 108 on the shaft 86. Thus, at a certain time in the revolution of the shaft, the pins 104′ will be caused to project upward between the adjacent longitudinal runs of the conveyer, as indicated in Fig. 8, so as to be in position to engage and thereby re-space and re-aline the cores A as the motion of the conveyer brings them against the pins 104′ which have no mobility lengthwise of the conveyer.

The lower receptacle 64 is preferably provided with a jacket 64′ for the circulation of steam or other heating medium so as to keep the material in proper condition. Preferably, the material is also agitated in said receptacle as by means of rotary blades 109 carried by shafts 110 which are driven from the shaft 76 by means of a chain 111 engaging sprockets 76′ and 110′. The heated material is transferred from the receptacle 64 to the tank 59 (and also from the latter to the receptacle 64 when required) by means of disks or pistons 112 secured to a cable or other flexible connection 113 supported by wheels 114 provided with suitable notches 114′ to receive the piston disks. The upper wheel 114 is secured to a shaft 115 driven from the shaft 76 by means of a belt 116 engaging pulleys 76″ and 115′. The piston disks 112 are adapted to move up and down in pipes 117 and 118 respectively, the upper end of the latter being at a level materially higher than the upper end of the pipe 117. The upper ends of said stationary pipes 117 and 118 are within the tank 59 while their lower ends are within the receptacle 64. The piston disks 112 will feed material continuously from the receptacle 64 to the tank 59, thus preserving a constant supply of material for the first and the second coating of the cores. If at any time too much material is transferred to the tank 59, the level of such material will finally rise above the upper end of the downtake pipe 118, whereupon the surplus will be returned to the lower receptacle 64 through said pipe partly by gravity and partly by the downwardly moving piston disks 112. The material in the upper tank 59 is preferably agitated as by means of paddles 119 oscillated or reciprocated lengthwise of the conveyer so as to drive the material toward the outlets of the tank, besides keeping the material in a homogeneous condition. I have shown the paddles 119 secured to arms 120 extending from rock shafts 121 also provided with upwardly extending arms 122. These arms 122 are connected by an actuating bar 123 having a slot or guide 123′ in which moves an eccentric 115″ secured to the shaft 115.

The operation of the machine is as follows: The cores A being placed on the receiving portion of the conveyer in any suitable manner, are advanced periodically by the intermittent longitudinal movement of said conveyer, and during one of the periods that the conveyer is stationary, the cores are properly spaced and alined by the action of the bar 37 and its pins 37′, which brings the cores close to the point where they are to receive the first coating, from the outlets 59′, 60′, 61′. The next longitudinal movement of the conveyer carries the cores through the streams of coating material issuing constantly from said outlets. These streams fall with a wavy motion and therefore the cores are completely enveloped in the coating material. The vibrating motion given to the conveyer between the roller 21 and the supporting bar 78 assists in securing an even distribution of the coating material on the cores, and the vibration of the bottoming bar 65 insures a thorough coating of the core bottoms. The vibrating motion stops at the bar 78 and the cores are then carried against the pins 104' (Fig. 8), which restore the proper spacing and alinement of the cores. At this moment the cores are slightly in the rear of the point at which the secondary coating or stroking is applied. The spoons 90 being in their upper position, as shown in Fig. 8, the gate 81 is opened for a moment, thus allowing a measured quantity of the coating material to pass from the tank 59 into each of the spoons. The spoons, being held at such an inclination that the coating material contained therein cannot escape, a downward movement of the spoons takes place with the gate 81 in the closed position (Fig. 9). This brings the spoons immediately in advance of the line of cores previously adjusted by the pins 104'. These pins having been dropped to the position shown in Fig. 9, the conveyer is again advanced so as to carry the said cores below and past the spoons 90, and at the same time the spoons are moved upward, during which upward movement their inclination is increased to a sufficient extent to cause the coating material to flow from the spoons onto the cores, thus applying an ornamental line of coating or stroking to said cores. Finally, the coated cores are removed from the conveyer in any suitable manner.

Whenever a different spacing of the cores is desired, I will exchange not only the plate 59ª and the spoon rod 91, but also the alining bars 37 and 104.

Various modifications may be made without departing from the gist of my invention as defined in the appended claims.

I claim as my invention:

1. The combination of an apertured conveyer for the articles to be coated, means for discharging a coating material upon said articles from above, a perforated bottoming bar arranged immediately below the conveyer and adapted to catch a portion of the coating material passing through the conveyer, and means for imparting an up-and-down movement to said bar.

2. The combination of an apertured conveyer for the articles to be coated, means for discharging a coating material upon said articles from above, a bottoming member arranged immediately below the conveyer and adapted to catch a portion of the material passing through the conveyer, and means for moving the conveyer and said bottoming member up and down, the upward movement of one being simultaneous with the downward movement of the other.

3. The combination of an apertured conveyer for the articles to be coated, means for discharging a coating material upon said articles from above, and a perforated bottoming bar arranged immediately below the conveyer and adapted to catch a portion of the coating material passing through the conveyer.

4. The combination of an apertured conveyer for the articles to be coated, means for discharging a coating material upon said articles from above, a perforated bottoming bar arranged immediately below the conveyer and adapted to catch a portion of the material passing through the conveyer, and a receptacle for catching the material dripping from said bar.

5. The combination of an apertured conveyer for the articles to be coated, a tank located above the conveyer and adapted to discharge a coating material upon said articles, a perforated bottoming bar arranged immediately below the conveyer and adapted to catch a portion of the material passing through the conveyer, a receptacle for catching the material dripping from said bar, and means for feeding the material to the tank from said receptacle.

6. The combination of an apertured conveyer for the articles to be coated, means for discharging a coating material upon said articles, a bottoming bar arranged immediately below the conveyer at the point where such material is supplied, another bar arranged to engage the conveyer in advance of said bottoming bar, and means for vibrating said bars up and down simultaneously but in opposite directions.

7. The combination of a conveyer for the articles to be coated, said conveyer having longitudinal spaces, and means movable lengthwise of the conveyer in said longitudinal spaces to engage and aline the articles on the conveyer.

8. The combination of a conveyer for the articles to be coated, said conveyer having longitudinal spaces, and an alining device having a body located under the conveyer and operating projections extending upwardly from said body through the spaces of the conveyer to engage the articles on the conveyer.

9. The combination of a conveyer for the articles to be coated, said conveyer comprising spaced longitudinal runs arranged side by side, and an alining device movable lengthwise of the conveyer and provided with projections extending between the said runs of the conveyer to engage and aline the articles on the conveyer.

10. The combination of a conveyer for the articles to be coated, said conveyer comprising spaced longitudinal runs arranged side by side, means for discharging a coating material upon said articles, and a bar movable lengthwise of the conveyer and provided with projections disposed in V-shaped fashion and adapted to extend between the said runs of the conveyer to properly space and aline the articles on the conveyer before they receive the coating material.

11. The combination of a conveyer for the articles to be coated, said conveyer comprising spaced longitudinal runs extending side by side, means for discharging a coating material upon said articles, and a bar movable lengthwise of the conveyer and also movable perpendicularly to the plane of the conveyer, said bar being provided with pins disposed in V-shaped fashion and adapted to project between said runs of the conveyer when said bar is moved toward the conveyer, so as to properly space and aline the articles on the conveyer before they receive the coating material.

12. The combination of a conveyer for the articles to be coated, means for discharging a coating material upon said articles, means movable lengthwise of the conveyer and adapted to properly space and aline the articles on the conveyer before they receive the coating material, and a retaining device for preventing the articles from following said means on its return movement.

13. The combination of a conveyer for the articles to be coated, said conveyer comprising spaced longitudinal runs extending side by side, means for discharging a coating material upon said articles, a bar movable lengthwise of the conveyer and provided with projections arranged to travel between said runs and adapted to engage and properly position the articles on the conveyer before they receive the coating material, and a retaining device having projections arranged between the paths of the projections on the said bar and adapted to prevent the articles from following said bar in its return movement.

14. The combination of a conveyer for the articles to be coated, means for discharging a coating material upon said articles, a bar movable lengthwise of the conveyer and having projections adapted to engage and properly position the articles on the conveyer before they receive the coating material, and a retaining gate having projections arranged between the paths of the projections on said bar and adapted to prevent the articles from following the said bar on its return movement.

15. The combination of a conveyer for the articles to be coated, a bar movable lengthwise of the conveyer and having projections adapted to engage and properly position the articles on the conveyer before they receive the coating material, and a pivoted retaining gate having projections arranged between the paths of the projections on said bar, the said projections on the gate being adapted to swing aside and let the articles pass on the forward movement of said articles, but preventing any return movement of the articles.

16. The combination of a conveyer for the articles to be coated, rotatable supports for said conveyer, a vibratory member engaging the upper run of said conveyer, means for discharging a coating material upon the articles carried by said conveyer, a supporting bar engaging the conveyer at a point in advance of the vibratory member, and a scraper engaging the inner surface of the conveyer between said bar and the farther rotary support.

17. The combination of a conveyer for the articles to be coated, supports engaging the ends of the operative portion of said conveyer, a vibratory member engaging the upper run of said conveyer, means for discharging a coating material upon the articles carried by said conveyer, a supporting bar engaging the conveyer at a point between the vibratory member and the farther end support, and a scraper engaging the inner surface of the conveyer between said bar and the vibratory member.

18. The combination of a conveyer for the articles to be coated, rotatable supports for said conveyer, a vibratory member engaging the upper run of said conveyer, means for discharging a coating material upon the articles carried by said conveyer, a supporting bar engaging the conveyer at a point in advance of the vibratory member, to arrest the vibration of the conveyer, and scrapers engaging the inner surface of the conveyer in advance and in the rear of said supporting bar respectively.

19. The combination of a conveyer for the articles to be coated, means for discharging a coating material upon said articles at two different points of the conveyer, and means, located adjacent to the conveyer between said two points, for properly spacing and alining the articles on the conveyer before they receive the second supply of coating material.

20. The combination of a conveyer for the articles to be coated, means for discharging a coating material upon said articles successively at two different points of the conveyer, and separate means, located adjacent to the conveyer between the two points at which the coating material is supplied, and also in the rear of the point where the first application of coating material is made, for properly spacing and alining the articles on the conveyer before they receive each of the two applications of the coating material.

21. The combination of a conveyer for the articles to be coated, means for discharging a coating material upon said articles at two different points of the conveyer, means movable lengthwise of the conveyer, for properly spacing and alining the articles on the conveyer before they reach the point where the first coating is applied, and means movable into and out of the path of the articles carried by the conveyer, to arrest and respace and re-aline the articles before they reach the point where the second coating is applied.

22. The combination of a conveyer for the articles to be coated, means for discharging a coating material upon said articles at two different points of the conveyer, and means movable toward and from the conveyer at a point intermediate between said two points, to arrest and properly space and aline the articles on the conveyer before they reach the point where the second coating is applied.

23. The combination of a conveyer for the articles to be coated, said conveyer comprising spaced longitudinal runs extending side by side, means for discharging a coating material upon said articles at two different points of said conveyer, and a spacing and alining bar having projections movable into and out of the spaces between the said runs of the conveyer, but having no mobility lengthwise of the conveyer, to arrest the articles carried forward by the conveyer and give them the proper spacing and alinement.

24. The combination of a conveyer for the articles to be coated, and means for discharging a coating materal on said articles, said means having outlets ranging obliquely with respect to the direction in which the conveyer travels.

25. The combination of a conveyer for the articles to be coated, a tank adapted to contain a coating material, located above said conveyer and provided with an outlet, and spoons movable between the tank outlet and the conveyer toward and from the conveyer and adapted to receive the coating material from said tank and to deliver it upon the articles carried by the conveyer.

26. The combination of a conveyer for the articles to be coated, a tank, located above the conveyer and adapted to contain a coating material, and spoons movable from the said tank to the conveyer, to carry the coating material from the tank to the articles on the conveyer.

27. The combination of a conveyer for the articles to be coated, a tank adapted to contain a coating material, a gate controlling an outlet from said tank, spoons movable from the tank to the conveyer, to carry the coating material discharged from said outlet, to the articles on the conveyer, and means for operating said gate and spoons.

28. The combination of a conveyer for the articles to be coated, a tank adapted to contain a coating material, spoons movable toward the conveyer from a point adjacent to the tank, and adapted to transfer the coating material from the said tank to the articles carried by the conveyer, and means for jolting the spoons during such transfer movement.

29. The combination of a conveyer for the articles to be coated, a tank adapted to contain a coating material and provided with a series of outlets, a set of spoons movable in unison and arranged to receive the material from said outlets, and to discharge it in individual streams upon the articles carried by the conveyer, and means for vibrating said spoons during the discharge of the material therefrom.

30. The combination of a conveyer for the articles to be coated, a tank provided with a series of outlets, and a set of spoons movable in unison and arranged to receive the material from said outlets and to discharge it in individual streams upon the articles carried by the said conveyer.

31. The combination of a conveyer for the articles to be coated, means for imparting an intermittent motion to said conveyer, and periodically operated means for discharging a coating material on said articles while they are being carried forward by the conveyer.

32. The combination of a conveyer for the articles to be coated, a tank adapted to contain a coating material, arms movable up and down, and spoons carried by said arms, for transferring the coating material from the said tank to the articles carried by the conveyer, said spoons being connected adjustably with said arms so as to permit of varying the inclination of the spoons.

In testimony whereof I have signed this specification in the presence of two subscribing witnesses.

GEORGE WHITE.

Witnesses:
 GEO. W. RURODE,
 M. L. NIMMO.